Aug. 23, 1927.
O. E. BOGAN
1,640,106
LICENSE PLATE FASTENER
Filed Nov. 18, 1926
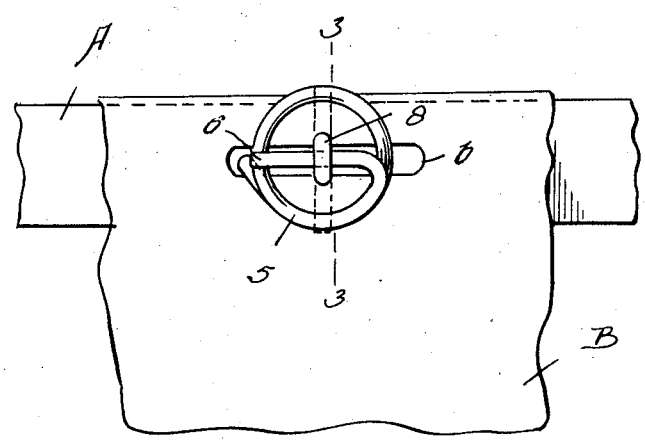
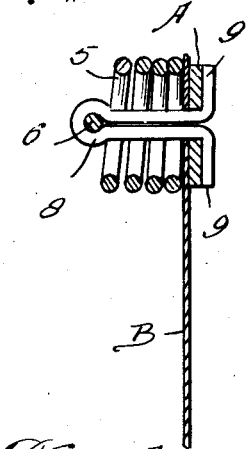
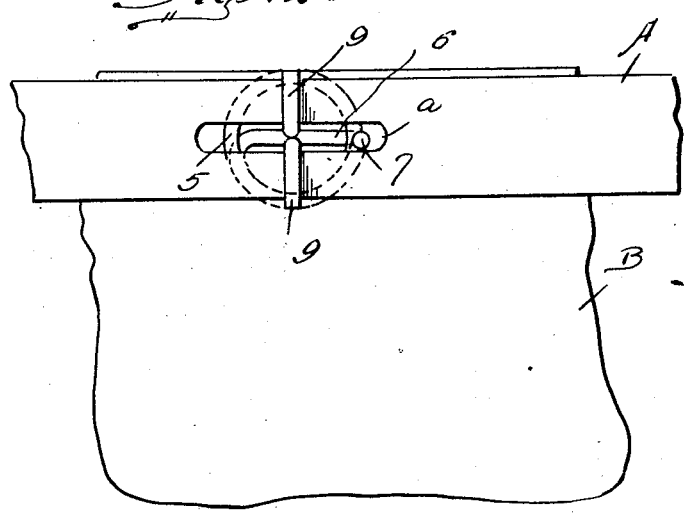
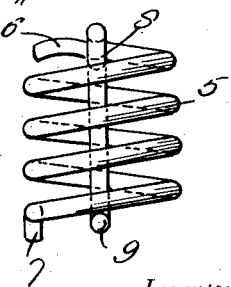
Inventor
Orley E. Bogan,
By Clarence A. O'Brien
Attorney Patented Aug. 23, 1927.

1,640,106

UNITED STATES PATENT OFFICE.

OBLEY E. BOGAN, OF CENTRALIA, ILLINOIS.

LICENSE-PLATE FASTENER.

Application filed November 18, 1926. Serial No. 149,175.

This invention relates to new and useful improvements in fastening devices, and has for its primary object to provide a simple and inexpensive means for facilitating the rigid securing of a license plate to the license plate supporting bar, and this in such a manner as to positively prevent the license plate from becoming detached from the bar, and for preventing the rattling of the plate against the bar.

A further and important object is to provide a fastener of this character that may be easily applied or removed, and that is so constructed that when once applied, the same cannot become accidentally displaced from position nor turned thereon to any extent whatever.

A still further and important object is to provide a fastener of this character that consists of but two elements, and these so co-related as to reduce the liability of disarrangement to a minimum.

Other objects will become apparent as the nature of the invention is better understood, the same comprising the novel form, combination, and arrangement of parts hereinafter more fully described, shown in the accompanying drawing and claimed.

In the drawing wherein like reference characters indicate corresponding parts throughout the several views:

Figure 1 is a fragmentary front elevation of a license plate secured to the license plate holder by reason of the present invention.

Figure 2 is a rear side elevation thereof.

Figure 3 is a vertical section taken substantially upon the line 3—3 of Figure 1, and Figure 4 is a side elevation of the fastener per se.

Now having particular reference to the drawing A designates a flat bar shaped holder to which the license plate B is to be attached. As is well known, such holders and license plates are formed with a plurality of registering longitudinal slots for the purpose of permitting the license plate to be rigidly secured to the holder. In the drawing only one slot is disclosed in the bar and license plate being respectively identified by the reference characters *a* and *b*.

The invention per se consists of a relatively short and wide strong expansible coil spring 5, the outer end of which is bent laterally across the end convolute of the spring as at 6. The other end of this spring is bent laterally inwardly to provide a lug 7 for a purpose hereinafter more fully described. Arranged longitudinally through the center of this coil spring 5 is a heavy cotter pin 8 through the eyed end of which projects the laterally bent end 6 of the spring while the inner ends of the legs of the cotter pin are bent outwardly at right angles as at 9—9 for engaging the opposite end of the spring to limit the expansion thereof, and to prevent the detachment of the pin with respect to said spring.

Obviously in use, the bent ends 9—9 of the cotter pin legs are arranged longitudinally with respect to the slots *a* and *b* in the holder and license plate respectively after which pressure is applied to the fastener for forcing the bent ends of the legs through to said slots.

After these ends have been projected entirely through the slots, the spring is given a one-quarter turn so that the bent ends of the cotter pin legs will overlie the edges of the slots of the holder bar A. At this time the lug 7 at the outer end of the spring will project through the slots for obviously preventing the fastener from turning after once disposed in position. On the other hand by compressing the spring to a greater extent than the extent of compression when the fastener is in use, the same may be turned to permit of the removing thereof.

It will thus be seen that I have provided a highly novel, simple, and efficient license plate fastener that is well adapted for all the purposes heretofore designated and even though I have herein shown and described the invention as consisting of certain detail structural elements, it is nevertheless to be understood that some changes may be made therein without effecting the spirit and scope of the appended claims.

Having thus described the invention, what I claim as new and desire to secure by Letters Patent is:—

1. In a fastener whereby a license plate may be secured to a supporting bracket, and wherein said plate and bracket are formed with registering slots, an expansible coil spring, a cotter pin arranged longitudinally through the spring and having the ends of the legs bent outwardly at right angles for overlying the innermost convolute of the spring when the spring is expanded, said bent ends of the cotter pin legs adapted for engagement through the registering slots in the license plate and supporting bracket when the spring is compressed after which said spring is turned to an extent that the bent ends of the cotter pin will overlie the edges of the slot in the bracket and means between the outer end of the cotter pin and said spring for interconnecting the same, said means consisting of a cross arm at the center of the spring formed integrally with the end most convolute of the spring, said arm engaging through the eyed end of said cotter pin.

2. In a fastener whereby a license plate may be secured to a supporting bracket, and wherein said plate and bracket are formed with registering slots, an expansible coil spring, a cotter pin arranged longitudinally through the spring and having the ends of the legs bent outwardly at right angles for overlying the innermost convolute of the spring when the spring is expanded, said bent ends of the cotter pin legs adapted for engagement through the registering slots in the license plate and supporting bracket when the spring is compressed after which said spring is turned to an extent that the bent ends of the cotter pin will overlie the edges of the slot in the bracket, means between the outer end of the cotter pin and said spring for interconnecting the same, said means consisting of a cross arm at the center of the spring formed integrally with the endmost convolute of the spring, said arm engaging through the eyed end of said cotter pin, and means formed integrally with the inner end of the frame for engagement within said registering slots to prevent the turning of the fastener after the same has been properly positioned.

In testimony whereof I affix my signature.

ORLEY E. BOGAN.